Jan. 15, 1946.  H. R. ELLINWOOD  2,393,033
CONDUIT SUPPORTING CLIP
Filed May 6, 1942
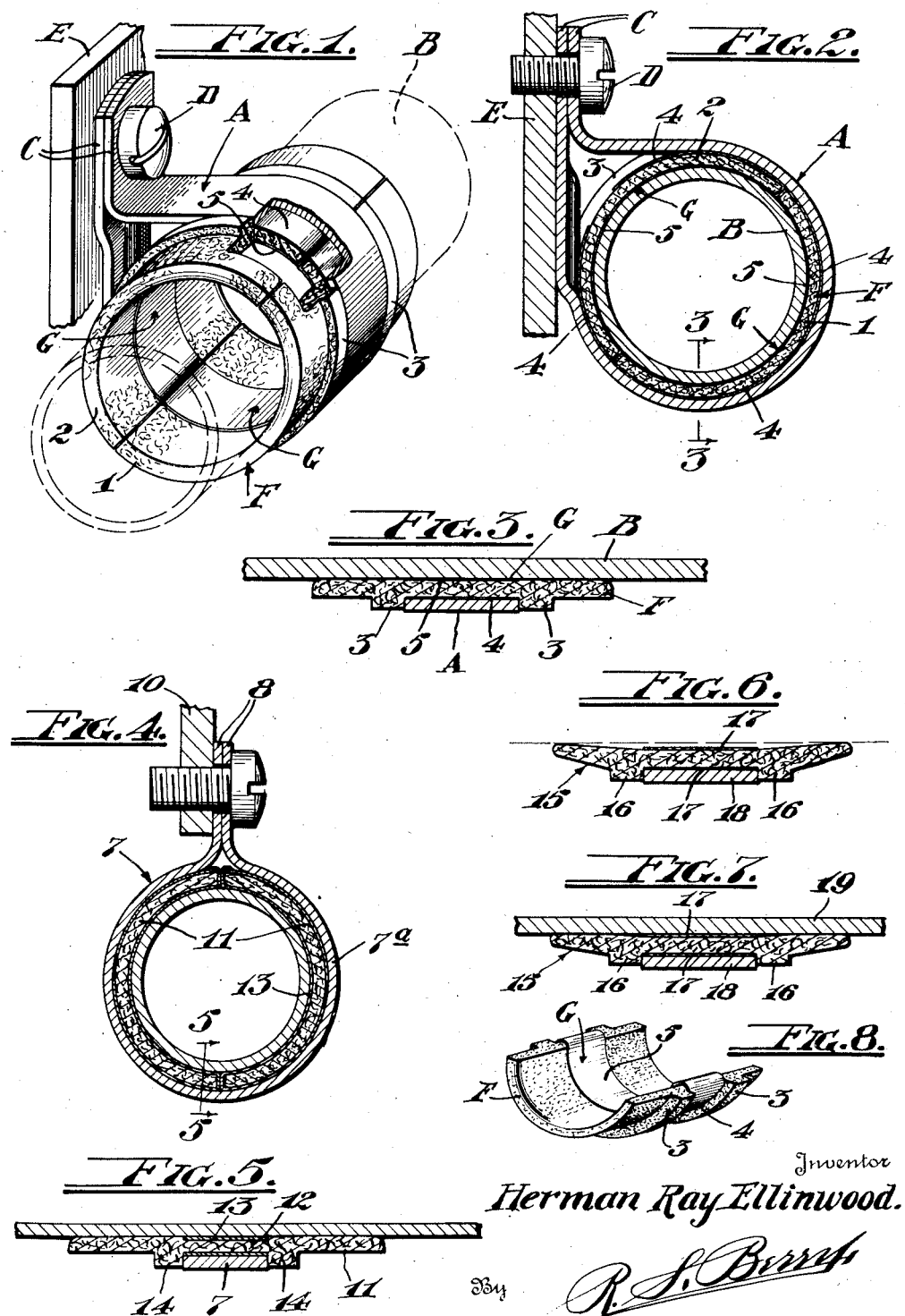
Inventor
Herman Ray Ellinwood.
By R. S. Birry
Attorney Patented Jan. 15, 1946

2,393,033

UNITED STATES PATENT OFFICE 2,393,033

CONDUIT SUPPORTING CLIP

Herman Ray Ellinwood, Burbank, Calif., assignor to Adel Precision Products Corp., a corporation of California Application May 6, 1942, Serial No. 441,979

3 Claims. (Cl. 174—40)

This invention relates to aircraft conduit supporting clips for securing the oil, air, gasoline, hydraulic system and other conduit lines to structural parts of the aircraft past and adjacent to which parts such lines are extended.

In view of the large numbers of conduit and clips required in the modern airplane, for the purposes above described, it is highly essential that such clips be capable of ready and easy installation, extremely light as to weight, and at the same time strong, durable and constructed to appreciably reduce friction and wear as well as prevent distortion of the conduit lines which are also of light construction and of necessity tightly clamped by the clips to insure stability and a reliability of support against the marked vibratory stresses to which the conduit and clips are subjected.

If a metal strap of requisite strength but of small gauge and having a width less than its length, as is desirable to conserve metal and reduce weight and bulk, is clamped around and in direct contact with a conduit line as a supporting clip therefor, it will sometimes distort or weaken the conduit due to the comparatively narrow supporting surface thus afforded. Moreover, such a strap may set up considerable friction and produce undue and damaging wear, also cause discharges of static electricity which may be dangerous or cause interference with the operation of radio equipment.

A comparatively narrow small gauge metal strap of requisite strength is highly desirable as the body portion of a clip for the purposes hereof in consideration of the reduction in weight and amount of metal employed and the facility of installation in confined places thereby afforded. Heretofore in this art it has been the practice to provide a conduit embracing cushion of rubber or synthetic rubber or the like on a metal conduit-embracing strap for the purpose of preventing distortion of the conduit when the clip is tightly clamped thereon, the cushioned seat thus afforded also absorbing vibrations and facilitating the use of a metal "bonding" strip for making an electrical "ground" and static-discharging connection between the conduit and the metal strap and through the latter to the metal structure of the airplane on which the clip is mounted. Clips of this type are disclosed in the United States Letters Patent No. 2,215,283 granted to Paul W. Adler on September 17, 1940, and although admirably suited to the general purpose of supporting conduits in airplanes do not provide sufficient seating area and rigidity and certain other characteristics found desirable for certain types of conduits and for certain locations along the conduit lines and in instances where the cushion is exposed to liquids and gases which have a deleterious effect thereon.

It is therefore an important object of my invention to provide a conduit supporting clip which affords the advantages and has none of the disadvantages or objections hereinbefore noted.

Another object of my invention is to provide a conduit clip for the purposes described which is especially designed for supporting conduit lines or conduits adjacent or within gasoline and oil tanks and at other points where liquids and gases would have a deleterious affect on clips having cushioned seats of rubber or like material which is ill-affected by such liquids and gases.

A further object of my invention is to provide a conduit clip of the character described wherein a substantially rigid, conduit-embracing and tubular bushing carried by a light-weight metal strap of the desired small width and requisite strength, provides a close fitting, substantially rigid conduit-supporting seat of sufficient area and such form as to protect the conduit from being deformed or damaged when the strap is tightly secured in place, while insuring a secure mounting of conduit.

A further object is to provide a conduit clip of the character described wherein the conduit-embracing bushing is made in sections providing an effective close-fitting and substantially rigid seat while at the same time allowing for expansion and contraction without distortion of the conduit, the bushing and the strap, or the loosening of the clip.

Another object of my invention is to provide a clip of the character described wherein the bushing is preferably made of a comparatively rigid material which is not ill-affected by gasoline, oils, gases and the like, for example a hard inelastic fibrous or plastic material such as Bakelite, Micarta and hard rubber or a fabric combined with a plastic substance forming a hard, stiff composition whereby such a bushing will be extremely light as to weight, highly wear resistant and serve as electrical insulation. A solid metal bushing having comparable rigidity to the nonmetallic bushing hereof would necessitate a thickness or density productive of a prohibitive weight and cost.

Another object of my invention is to provide a clip such as described in which the bushing is effectively interlocked with the metal strap to prevent displacement thereof.

A further object of my invention is to provide a conduit clip of the character described in which a non-metallic bushing forming a support for the conduit is provided with a metallic, electrically conductive bonding or static-discharge strip for "grounding" the conduit to the metal strap which supports the bushing the bushing being constructed to retain the bonding strip in place thereon and said strip being mounted on the bushing in such manner as to be protected thereby and effectively held in contact with the strap as well as in position for a good "bonding" contact with the conduit.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a fragmentary perspective view of a clip embodying my invention as applied;

Fig. 2 is a vertical sectional view of the clip as shown in Fig. 1;

Fig. 3 is a fragmentary sectional view taken on the line 3—3 of Fig. 2;

Fig. 4 is a fragmentary vertical sectional view of a modified form of clip embodying my invention;

Fig. 5 is a fragmentary sectional view taken on the line 5—5 of Fig. 4;

Fig. 6 is a cross sectional view of another modified form of my invention as it would appear before being secured in place;

Fig. 7 is a cross sectional view of the clip as shown in Fig. 6 as it would appear when installed or applied;

Fig. 8 is a perspective view of one of the sections of the bushing as when removed from the strap.

Referring to the drawing more specifically, one form of clip embodying my invention is shown in Figs. 1, 2 and 3 as generally including a bendable somewhat resilient metal strap A adapted to embrace a metal conduit B so that its separable and apertured ends C may be secured by means of a fastening D to a metallic structural part E of an airplane. A protective conduit-embracing and comparatively rigid bushing F is supported by the strap and as here provided may be equipped with an electrically conductive bonding strip G, or two thereof, for contact with the conduit and the strap to prevent dangerous and radio interfering discharges of static electricity.

In accordance with the present invention the bushing F is tubular and made in sections 1 and 2 which are semi-cylindrical and when fitted together will completely encircle the conduit in close conformity therewith while projecting from opposite edges of the relatively narrow metal strap A, for example, a distance substantially equal the width of the strap, which latter embraces the mid-portion only of the bushing. As the bushing is comparatively rigid and long and constructed and associated with the strap in the manner hereinbefore stated, it provides a large and effective supporting surface and may be tightly clamped on the conduit without deforming or weakening the conduit as would be likely if the relatively narrow metal strap were directly and tightly clamped against the conduit.

When the bushing sections 1 and 2 are clamped in place on the conduit the longitudinal edges of said sections substantially abut but will separate upon expansion of the conduit, the resiliency of the strap A being a contributing factor in this action. However, it should be noted that in having the sections of the bushing form a tight fitting cylinder around the conduit, this cylinder, although sectional, is rigid and firmly held in the strap and will not be deformed when the strap is tightly clamped thereon. Thus the bushing protects the conduit against being deformed and weakened or impaired by the clip.

It has been found that a bushing such as described made of relatively stiff and somewhat hard and inelastic plastic or fibrous material such as Bakelite, Micarta, hard rubber or the like, will provide the desired strength and rigidity as well as desired insulation with a very low weight and cost which cannot be achieved with a metal bushing. Moreover, such a bushing will more effectively resist wear and cause less abrasion than a metal bushing while providing somewhat of a vibration damping action not afforded by a metal bushing.

It will be noted that the sections 1 and 2 of the bushing F are provided on their outer surfaces and between the circumferential median line and the respective ends thereof with spaced ribs or flanges 3 between which the metal strap A is mounted so as to hold the bushing and strap against relative displacement. Moreover, these ribs or flanges reinforce the bushing.

As here shown two bonding strips G are employed, there being one on each section of the bushing, but it is obvious that I may use a single bonding strip if desired. These bonding strips are made of very thin and flexible metal and are comparatively narrow, being wrapped around the sections circumferentially (see Figs. 2 and 8) with their end portions 4 lying between the bushing and the strap in contact with the latter, while their main or mid portions 5 overlie the inner faces of said sections for direct contact with the conduit. In the present embodiment the bonding strips are of such width as to lie snugly between the flanges 3 as shown in Fig. 3, being therefore about equal to the width of the metal strap, although these dimensions may be varied somewhat as conditions may demand, it being obvious that narrower strips may be used if desired and that in any case said strips will bond the conduit line to the metal strap which in contacting the metal structural support E will "ground" the conduit line thereto for the purposes hereinbefore noted.

It should be noted that when the tangentially extended free ends C of the strap A are moved towards one another the strap is constricted and engages and forces the sections 1 and 2 of the strap in gripping and holding engagement with the conduit. The clamping of these ends together and the affixation of the clip to the supporting structure E are accomplished by means of the fastening D.

The clip of the present invention is particularly well adapted for installation at points where it is exposed to liquids and gases which have a deleterious effect on rubber and other compressible or cushioning materials, such as in or near gasoline and oil tanks and the like, inasmuch as the plastic or fibrous bushing F will not be softened or otherwise ill-affected or impaired by such liquids or gases.

As shown in Figs. 4 and 5 a modified form of my invention includes a metal strap 7 corresponding to the strap A shown in Figs. 1 and 2 with the exception that the apertured ends 8 extend radially outwardly from the loop portion 7a of the strap instead of tangentially and are adapted to be secured by means of a fastening to a metallic supporting structure 10.

Supported by the strap 7 is a sectional bushing 11 of the same material and construction as the bushing F shown in Figs. 1, 2 and 3, except that the sections thereof are provided with grooves 12 on their inner faces for accommodation of the bonding strips 13. This arrangement, as best shown in Fig. 5, provides for a flush mounting of the bonding strips and also holds the strips against displacement relative the sections of the bushing. In all other respects the bushing is the same as in the first described form of the invention, the strips being wrapped around the sections in the same manner, and the strap 7 being mounted between flanges 14 on the sections of the bushing. This form of my invention is adapted to be mounted so that it will hang or depend from a structural member such as the one 10, as shown in Fig. 4. However, it is obvious that the feature of mounting the bonding strips in grooves or recesses in the sections of the bushing may be employed to advantage in any embodiment of my invention.

Another modification of my invention, as shown in Figs. 6 and 7, takes into consideration the provision of a bushing 15 identical with the bushing F as to the material of which it is made and its construction, except that it is tapered and reduced in thickness from the ribs or flanges 16 toward the respective ends thereof and is therefore made somewhat resilient. Moreover, the bushing is formed with a slight concavity in cross section on the inner surfaces of the sections thereof or in other words has a greater internal diameter intermediate its ends to accommodate the bonding strips which are mounted on the bushing in the same manner as shown in Figs. 2 and 8. When the strap 18 is secured in place the bushing flattens out somewhat as shown in Fig. 7 to provide effective supporting surfaces in close contact with the conduit 19 at points outwardly spaced from the longitudinal edges of the bonding strips.

In all the illustrated embodiments of the invention the semi-annular shape of each of the grooved sections of the bushing provides a convenient part around which a bonding strip may be circumferentially wrapped in a convenient manner to the extent and in the manner shown, each bonding strip being looped over an edge portion of the bushing section to which it is applied. Said looping over of the bonding strip causes one portion thereof to contact with the bushing and another portion thereof to contact with the metallic suspending strap.

It will now be apparent that the embodiments of my invention hereinbefore described and as shown in the accompanying drawing will provide the objects hereof and eliminate the objections heretofore encountered in this art in an efficacious manner by reason of the particular materials used and the special construction and relative arrangements of the parts and elements thereof.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a conduit supporting clip, a rigid, non-metallic bushing of inelastic material adapted to encircle a conduit, a bendable strap supporting said bushing and having terminals adapted to be mounted on a support, said strap surrounding and operating to clamp said bushing against the conduit when said terminals are brought together, said bushing having an enlarged internal diameter between its ends, and a bonding strip a part of which occupies the space afforded by said enlarged part of the internal diameter of said bushing and another part of which engages said strap.

2. In a conduit supporting clip, a rigid sectional, non-metallic bushing of inelastic material adapted to encircle a conduit, and a bendable strap surrounding said bushing and contacting the sections thereof so that said sections will be clamped against the conduit by constriction of the strap, the sections of said bushing having a greater internal diameter intermediate its ends whereby only the end portions of the bushing will contact the conduit.

3. In a conduit supporting clip, a rigid sectional bushing of inelastic insulation material adapted to encircle a conduit, a metal strap surrounding said bushing and contacting the sections thereof so that said sections will be clamped against the conduit by constriction of the strap when the free ends of the latter are moved toward one another, said bushing having a greater internal diameter between its ends to provide a space between the bushing and the conduit; and a metal bonding strip wrapped around one of said sections, and having a portion disposed in said space for contact with the conduit, and another portion engaged with said strap.

HERMAN RAY ELLINWOOD.